(12) United States Patent
SenGupta et al.

(10) Patent No.: US 6,495,047 B1
(45) Date of Patent: Dec. 17, 2002

(54) PROCESS FOR SELECTIVE COAGULANT RECOVERY FROM WATER TREATMENT PLANT SLUDGE

(75) Inventors: Arup K. SenGupta, 3286 Marchant Dr., Bethlehem, PA (US) 18017; Prakhar Prakash, Bethlehem, PA (US)

(73) Assignee: Arup K. SenGupta, Bethlehem, PA (US)

( * ) Notice: Subject to any disclaimer, the term of this patent is extended or adjusted under 35 U.S.C. 154(b) by 121 days.

(21) Appl. No.: 09/813,469

(22) Filed: Mar. 21, 2001

(51) Int. Cl.[7] .......................... B01D 61/00; B01D 15/04
(52) U.S. Cl. ...................... 210/638; 210/644; 210/649; 210/639; 210/723; 210/711
(58) Field of Search ................................ 210/638, 639, 210/723, 711, 767, 644, 649

(56) References Cited

U.S. PATENT DOCUMENTS

| | | | |
|---|---|---|---|
| 4,676,908 A | * | 6/1987 | Cipielea et al. |
| 5,043,072 A | * | 8/1991 | Hitotsuyanagi et al. |
| 5,304,309 A | | 4/1994 | Sengupta |
| 6,379,551 B1 | * | 4/2002 | Lee et al. |

OTHER PUBLICATIONS

J. Masides, J. Soley and J. Mata–Alvarez, A Feasibilty Study of Alum Recovery In Wastewater Treatment Plants, Wat. Res. vol. 22 No. 4 pp. 399–405, 1988, Great Britain.

Arup K. Sengupta and Bo Shi, Selective Alum Recovery From Clarifier Sludge, Jour. AWWA, 84:96, (1992).

Mark M. Bishop, A.T. Rolan, Tom L. Bailey, and David A. Cornwell, Testing of Alum Recovery for Solids Reduction and Reuse, Jour. AWWA, 79:76, (1987).

Richard M. Wallace, Concentration and Separation Of Ions by Donnan Membrane Equilibrium, Ind. Eng. Chem., Process Des. Dev., 6(4) 423–431, (1967).

* cited by examiner

*Primary Examiner*—Ana Fortuna
(74) *Attorney, Agent, or Firm*—Howson and Howson

(57) ABSTRACT

Alum, used as a coagulant in water treatment, is recovered from clarifier sludge by adjusting the pH of the sludge downward to produce an aqueous clarifier sludge solution, and contacting the aqueous clarifier sludge solution with one side of a semi-permeable cation exchange membrane while contacting the other side of the membrane with an acidic sweep solution. By virtue of the Donnan co-ion exclusion phenomenon, aluminum ions, which are trivalent, pass readily through the membrane, in preference to divalent and monovalent cations, and consequently heavy metal carry-over is relatively low. Organic matter carryover is substantially excluded, and consequently, the recovered alum can be reused without the potential for trihalomethane formation. The reactor is preferably in the form of a stack of spaced membranes, with the aqueous clarifier sludge solution and the acid sweep solution flowing through alternate spaces. The same process can be used for recovery of ferric iron coagulants.

17 Claims, 8 Drawing Sheets

PROCESS FOR SELECTIVE COAGULANT RECOVERY FROM WATER TREATMENT PLANT SLUDGE

BACKGROUND OF THE INVENTION

In the United States, there are over one thousand drinking water treatment plants which use alum, $Al_2(SO_4)_3 \cdot 14H_2O$, as a coagulant for efficient removal of particulate solids and colloids. In the treatment process, alum is finally converted into insoluble aluminum hydroxide, $Al(OH)_3$, which constitutes a major component, e.g., from about 25% to 50%, of the solids in water treatment residuals (WTR), i.e., clarifier sludge. The water treatment sludge is essentially a bulky, gelatinous slurry composed of suspended inorganic particles, natural organic matter (NOM), trace amounts of heavy metal precipitates and aluminum hydroxide. Clarifier sludges are biologically inert and retain near-neutral pH. The total solids content of the sludge normally ranges from 2 to 10 percent in mass per unit volume. Water treatment plants in the United States produce over 2 million tons of aluminum-laden disposable solids every day. Due to recent regulatory changes, disposal of sludges must now be carried out by way of landfills or land application. Because of the magnitude and pervasiveness of the disposal problem, alum recovery from clarifier sludge has received considerable attention. The toxicity of free and complexed aluminum species to aquatic life, including benthic organisms, is also a matter of concern, and has been the focus of several studies.

An ideal solution to the problems of sludge disposal and toxicity would be a simple-to-operate process which selectively recovers alum from the sludge to reduce the volume of the disposable solids, and which delivers the recovered alum in a form sufficiently pure to be recycled for use as a coagulant at the front end of the water treatment plant. Such a process will truly combine pollution prevention with resource recovery, thereby significantly reducing the stress on the environment.

When clarifier sludge is sufficiently acidified with sulfuric acid, insoluble aluminum hydroxide is dissolved in the form of dilute liquid alum. The stoichiometry of this reaction is as follows:

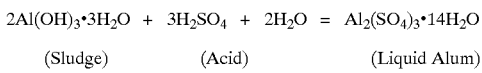

This reaction illustrates the underlying concept of the acid digestion process, which has been tried both at laboratory and pilot-scale levels.

The basic concept of the process of alum recovery is simple. However, the process is subject to shortcomings which have ruled out the possibility of reusing the recovered liquid alum as a coagulant. The process is non-selective. Along with alum it also recovers all other substances that are soluble under highly acidic conditions or that exist as colloids. If this occurs and the recovered alum is recycled for water treatment, the potability of the water will be degraded. Consequently, the acid digestion process may not be used in areas where such impurities present problems.

Potential impurities which can be converted to soluble form by acidification include iron, manganese, chromium and other metals, including those metals which are inherently present as impurities in the sulfuric acid used in the process. For example, significant concentrations of manganese exist in raw water at some locations, and the concentration of manganese in the delivered water may be increased to unacceptable levels when alum is recovered for reuse as a coagulant. Heavy metals, such as copper, lead, cadmium, etc. are normally present in relatively low concentrations in clarifier sludge. However, the concentrations of these heavy metals may increase to significant levels if the sludge is recycled in order to recover alum. The problem of increased concentration of an undesirable substance in the recovered alum can occur with many different substances present in ionic or colloidal form in the raw water, especially substances which have a low solubility and a high settling rate in the clarifier.

Naturally occurring organic material (humates and fulvates), which are generally removed quite well by alum coagulation, will be present in the recovered alum. Should this recovered alum be reused as a coagulant, the concentration of organic matter in the treated water will tend to increase, thereby significantly increasing the potential for formation of trihalomethanes (THMs), which are suspected carcinogens.

Since aluminum oxide is amphoteric, theoretically alum could be recovered from clarifier sludge under alkaline conditions as well as under acidic conditions. However, dissolved organic carbon (DOC) tends to increase with dissolved Al(III) under both acidic and alkaline conditions. Since a high concentration of dissolved organic matter is very undesirable in recovered alum due to its potential for formation of trihalomethanes, neither acid nor alkali digestion processes have been able to achieve satisfactory selective alum recovery in practice.

Acid digestion, that is, acidic extraction using sulfuric acid, is the most widely used method for alum recovery. When clarifier sludge is sufficiently acidified with sulfuric acid, insoluble aluminum hydroxide is dissolved in the form of dilute liquid alum as shown in the equation:

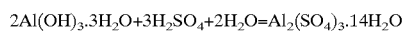

This equation illustrates the underlying concept of the acid digestion process, which has been tried on a laboratory scale, in pilot scale studies, and in full-scale at one of the water treatment plants of Durham, N.C. Studies on this process have shown that the aluminum concentration in recovered supernatant liquid ranged from 360 to 3700 mg/l. In addition to aluminum, the recovered alum was also found to contain other metals such as manganese, zinc and lead. The concentration of heavy metals such as As, Cr, Cu, Ni, Pb and Zn ranged from 0.002 to 8.5 mg/l. The total DOC ranged from 326 to 1800 mg/l, which was of the same order of magnitude as the recovered aluminum concentration. Similarly, the concentration of humic substances ranged from 160 mg/l to 1140 mg/l. Thus, the acid digestion process is non-selective; it cannot prevent DOC and heavy metals from being carried over into the recovered alum. The process is not capable of yielding high concentrations of aluminum ions, and the recovered alum is subject to reduced coagulation efficiency due to the presence of dissolved organic carbon.

In the case of Alkali digestion, at increased pH, the total DOC increases markedly. At a pH of 12, the DOC of water treatment residuals increases rapidly to over 1000 mg/liter. Furthermore at high pH levels, undissolved organics tend not to settle adequately and lead to poor quality in the recovered solution.

Liquid Ion Exchange (LIE) has also been tried. According to one study, this process can concentrate aluminum to a level as high as 4000 mg/l from an initial level of 1000 mg/l. However, this takes place in a second stage of stripping. In the first stage of extraction, the concentration ratio is 1:1. Entrainment issues are always a concern in the stripping process, because it involves separating aluminum ions from an organic phase into which the aluminum ions are dissolved in the first stage. In the stripping process, aluminum is recovered from the organic phase and the latter recycled. Since ideal 100% separation cannot be achieved, organics are carried over with dissolved aluminum. The liquid ion exchange process is operationally complex and expensive, and capable of delivering only a low concentration of recovered alum. Solvent carryover in the recovered alum is also a problem inherent in liquid ion exchange, and requires additional treatment steps.

Ultrafiltration is another technique that can be employed following acid treatment. However, ultrafiltration suffers from various shortcomings including fouling, decreased membrane life due to pressure differential, a decrease in flux with continued deposition, and the relatively high cost of pumping.

Still another approach is the cyclic composite membrane process described in U.S. Pat. No. 5,304,309, dated Apr. 19, 1994. In this process, aluminum ions are selectively sorbed from an aqueous phase (containing dissolved aluminum in acidified WTR) onto a composite membrane and thereafter desorbed, with the release of aluminum ions, as the composite membrane is regenerated in a sulfuric acid solution. The process is carried out in a continuous cycle characterized by the following equations:

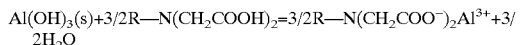

The cyclic composite membrane process overcomes many of the shortcomings of the previous processes in that it selectively recovers aluminum ions and prevents passage of natural organic materials, heavy metals and manganese into the recovered alum. However, composite ion exchange materials are not available in sizes appropriate for large-scale applications, and the process is not capable of concentrating alum to high levels. Furthermore, the process is a two-stage process with inherent complexity, and subject to various operational problems such as difficulties in rinsing the membrane.

An object of this invention is to overcome at least some, and preferably all, of the above-mentioned deficiencies in previously proposed alum recovery techniques.

In accordance with the invention, the pH of clarifier sludge is adjusted to a level, preferably about 3, such that at least the majority of its aluminum content is in solution. The pH adjustment results in an aqueous clarifier sludge solution, which is then brought into contact with a first side of a semi-permeable cation exchange membrane, preferably by circulating the solution through a first circulatory flow path. Simultaneously, an acidic sweep solution is brought into contact with the opposite side of the membrane, preferably by circulating it through a second circulatory flow path. By Donnan dialysis, aluminum ions are caused to pass through the membrane in one direction while hydrogen ions pass through the membrane in the opposite direction. Anions, organic molecules and suspended solids are substantially prevented from passing through the membrane, and aluminum ions are selectively favored over monovalent and bivalent cations for passage through the membrane. Thus, the concentration aluminum in the second circulatory path increases while the solution in the second circulatory path remains substantially free of anions and organic molecules, the concentration of toxic metals in the second circulatory flow path is maintained at a low level, and the hydrogen ions regenerate the membrane and acidify the aqueous clarifier sludge solution thereby causing further quantities of aluminum in the first circulatory path to go into solution.

In a preferred mode, the cation exchange membrane comprises a plurality of sheets of cation exchange membrane disposed in a stack, the sheets being separated from one another in the stack by spaces through which the solutions flow, and the solutions are directed to and from the stack so that clarifier sludge solution and acidic sweep solution flow through alternate spaces. Preferably the spaces through which the clarifier sludge solution flows are connected in series, and the spaces through which the acidic sweep solution flows are also connected in series.

The process is preferably carried out with the pressure difference across the membrane maintained substantially at zero.

The process provides for a simple and effective recovery of alum, substantially free of solids, natural organic matter and dissolved organic carbon, and with relatively low carryover of toxic metals. The recovered alum is therefore suitable for reuse as a coagulant in the same water treatment plant from which it was recovered, and the formation of trihalomethanes upon chlorination is substantially avoided.

Further objects, advantages and details of the invention will be apparent from the following detailed description when read in conjunction with the drawings.

DETAILED DESCRIPTION

The invention takes advantage of a process known as the Donnan Membrane Process (also referred to as Donnan Dialysis) for removal of aluminum ions from clarifier sludge and aluminum enrichment. The Donnan membrane process is based on the Donnan co-ion exclusion phenomenon, according to which negatively charged cation exchange membranes will reject anions, while positively charged anion exchange membranes will reject cations. Unlike other membrane processes, the Donnan membrane process does not require a pressure gradient or an electric current supply, and operates by virtue of the electrochemical potential difference between electrolytes on two sides of an ion exchange membrane.

The principle underlying the Donnan membrane process may be summarized briefly as follows. If solutions of electrolyte are placed on opposite sides of a cation exchange membrane, the anion compositions will remain unchanged, but the cations will redistribute themselves between the two sides to satisfy the following condition at equilibrium:

$$\left[\frac{C_{iR}^{z+}}{C_{iL}^{z+}}\right]^{\frac{1}{z}} = \left[\frac{C_{jR}^{y+}}{C_{jL}^{y+}}\right]^{\frac{1}{y}} = K$$

Where C is the molar concentration of cations "i" and "j" with charges "z" and "y" respectively, subscripts L and R refer to the Left and Right hand sides of the membrane and K is a constant. The equation is equally valid for an anion exchange membrane, which allows only anions to permeate and redistribute but is impermeable to cations. In the case of multivalent cations having a charge z and a monovalent cation, having a charge y, used as a sweep solution, it will be observed from the above equation that the multivalent cations can be concentrated from a lean feed solution by counter-transport of the monovalent cation used as a sweep solution.

Figure 1:
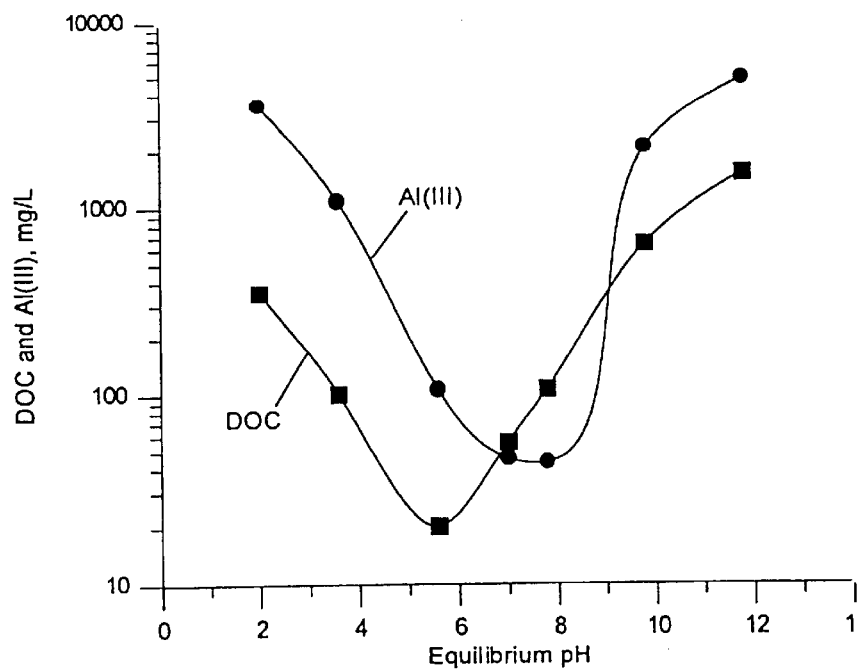
FIG. 1 is a graph illustrating the influence of pH on dissolved organic carbon (DOC) and Al(III) concentrations in a typical water treatment plant sludge.

FIG. 1 shows both Dissolved Organic Carbon (DOC) and Al(III) concentrations in a typical water treatment plant clarifier sludge (in this case the plant at Allentown, Pa.) at different pH levels. The Allentown Water Treatment Plant (AWTP) clarifier sludge, which ordinarily has a pH of 7.1, had a total suspended solids content of 112 g/L, a total aluminum content of 5.6 g/L, a total iron content of 1.6 g/L, and other constituents as follows: 860 mg/L total organic carbon, 30 mg/L dissolved calcium, 15 mg/L dissolved sodium, 85 mg/L total manganese, 23 mg/L total zinc, 3.2 mg/L total copper, and a negligible amount of cadmium. The components given as total amounts were determined by analysis after digestion of sludge for 24 hours at ambient temperature (24.2° C.) and at a pH less than 1.0 by addition of concentrated sulfuric acid.

As shown by FIG. 1, DOC tends to increase with dissolved Al(III) under both acidic and alkaline conditions. Since a high concentration of dissolved organic matter is very undesirable in recovered alum due to its potential for the formation of trihalomethanes, neither acid nor alkali digestion is able to achieve selective alum recovery.

Figure 2:
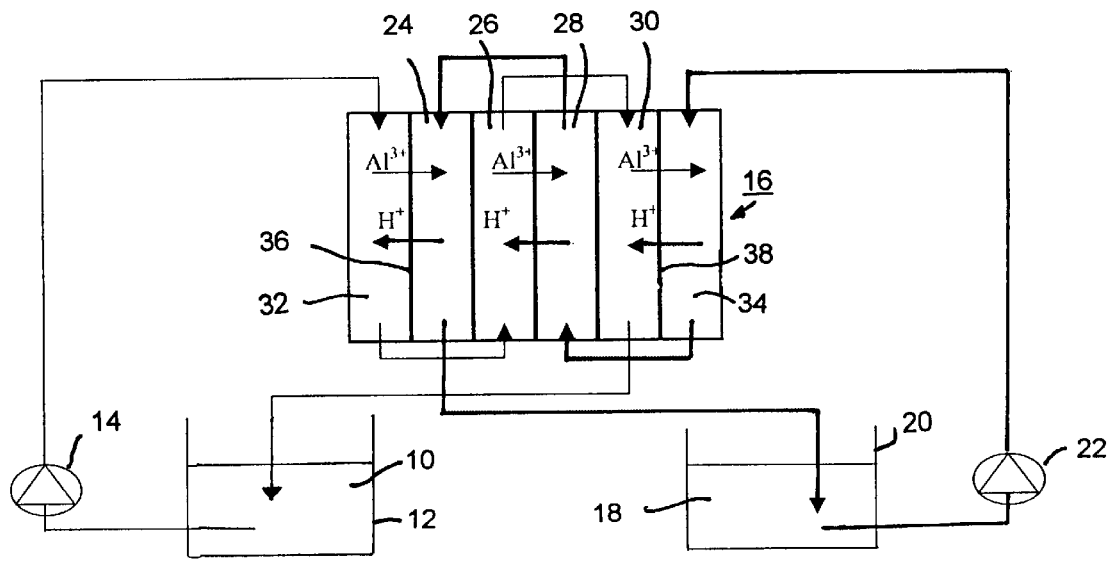
FIG. 2 is a schematic diagram illustrating an apparatus for carrying out the process in accordance with the invention.

As illustrated in FIG. 2, clarifier sludge 10 is collected in a vessel 12. The clarifier sludge is rich in aluminum hydroxide, Al(OH)$_3$, natural organic matter and suspended solids. The pH of the sludge, which is normally about 7.1, is adjusted to about 3.0, by the addition of an acid such as sulfuric acid, to cause at least the majority of the aluminum content of the clarifier sludge to go into solution. Later on, H$^+$ ions from the acid sweep solution cause the pH to fall further, and the remaining aluminum still locked up in the solid phase will also dissolve. Transfer of aluminum ions to the sweep side will also promote further solution of aluminum hydroxide precipitates.

After pH adjustment, the aqueous clarifier sludge solution is pumped by a low pressure pump 14, in a first circulatory flow path, through an exchanger 16 comprising cation exchange membranes. The membranes can be Nafion membranes available from E. I. DuPont de Nemours, Wilmington, Del. A preferred membrane is DuPont Nafion 350, which is a robust membrane capable of withstanding extremes of pH. Other suitable cation exchange membranes are available from Sybron Chemicals, Birmingham, N.J., U.S.A. and Mitsubishi Chemical Armerica Inc., in White Plains, N.Y., U.S.A. At the same time, sulfuric acid solution 18, (H$_2$SO$_4$), is pumped as a sweep solution through the exchanger in a second circulatory flow path, from a supply vessel 20, by a low pressure pump 22. Preferably, the sulfuric acid in the sweep solution in vessel 20 is initially at a concentration in the range from 5–10% by volume.

The membranes are arranged in a stack, with spaces for the flow of liquid provided at 24, 26, 28 and 30 between adjacent membranes, and at 32 and 34 on the exterior sides of end membranes 36 and 38, respectively. As illustrated in FIG. 2, the sludge is directed through an elongated path including spaces 32, 26 and 30 in series, and returned to vessel 12. The sweep solution of sulfuric acid is pumped through a path including spaces 34, 28 and 24 in series, and returned to vessel 20. The spaces 32, 26 and 30 of the sludge solution path and the spaces 34, 28 and 24 of the sweep solution path are in alternating arrangement.

In the operation of the apparatus illustrated schematically in FIG. 2, Aluminum hydroxide is converted to soluble aluminum sulfate as a result of the addition of sulfuric acid for pH adjustment. As the solution is pumped though the clarifier sludge solution path (which includes spaces 32, 26 and 30 of the exchanger), anions (e.g., chloride, sulfate, etc,) dissolved organic matter, and large neutral organic molecules are prevented from passing through the membranes and therefore, their concentrations on opposite sides of the exchanger remain practically unchanged. On the other hand, aluminum (III) ions, because they are multivalent, pass readily through the membranes from the clarifier sludge solution path to the sweep solution path, while hydrogen ions pass through the membranes in the opposite direction, from the sweep solution path to the clarifier sludge solution path. Monovalent and divalent metals pass through the membranes to a limited extent along with aluminum, but the carryover of monovalent and divalent metals is inherently limited by the Donnan membrane process as described above. The passage of ferric ions, Fe(III), through the membranes along with aluminum is desirable since Fe(III) enhances the effectiveness of alum as a coagulant and has no other adverse effects. It is unnecessary to attempt to prevent carryover of Fe(III). Ferric salts are also used as coagulants in many water treatment plants. The process described here can also selectively recover Fe(III) from clarifier sludge, as discussed subsequently.

Ultimately, after operation of the exchanger for a time, vessel 12, which initially contained significant quantities of Al(OH)$_3$ along with natural organic matter and suspended solids, will contain primarily insoluble suspended solids, and some monovalent and divalent metal compounds, but will be substantially aluminum-free. The vessel 20, on the other hand, which initially contained a solution of H$_2$SO$_4$, will ultimately contain an acidic solution of Alum, in a concentration in the range of 4–10 g/L, virtually free of dissolved organic matter, suspended solids and toxic metals.

Experiments were carried out using clarifier sludge obtained from the Allentown, Pa. Water Treatment Plant (AWTP). The AWTP has a production capacity of 8 million gallons (30,000 m$^3$) per day. The plant utilizes alum addition, rapid mixing, flocculation, settling, chlorination and filtration to treat surface water from the Little Lehigh River. Alum is used to remove turbidity from the surface water, which ranges from 2 NTU to 680 NTU, and the alum dosage ranges from 10 to 50 mg/l as alum. Settled sludge is drained about two times per week from the storage zone of the clarifier. The clarifier sludge was used in Donnan membrane process experiments carried out in a laboratory using a single membrane, Donnan Membrane exchanger. The exchanger was divided into a feed chamber and a sweep chamber, each having a length of 30 cm, a width of 7 cm and a height of 40 cm. The feed chamber contained the clarifier sludge and the other chamber held an acid solution. The two chambers were separated by an acrylic resin frame holding a Nafion 350 cation exchange membrane 20 cm in length and 30 cm high. Mild agitation was maintained by bubbling air into the solutions through a distributor with small nozzles. The air supply was adjusted to a pressure of 1 psig to ensure uniform agitation.

The clarifier sludge in the feed chamber was laden with alum and other constituents including NOM, suspended solids etc. The sweep chamber contained 5–10% sulfuric acid.

Samples, collected at regular intervals, were analyzed for ions. Aluminum was analyzed using a UV-VIS Spectrophotometer. Its concentration in the clarifier sludge fell with transport of hydrogen ions from the acid sweep solution. The concentrations obtained at various times were used to calculate the aluminum transfer flux. Other cations were analyzed using a Perkin Elmer Model 2380 Atomic Absorption Spectrophotometer. The DOC was measured using a Shimadzu Model 5050A TOC Analyzer. Anions were analyzed for Donnan exclusion, using Dionex Model DX-120C Ion Chromatograph.

Figure 3:
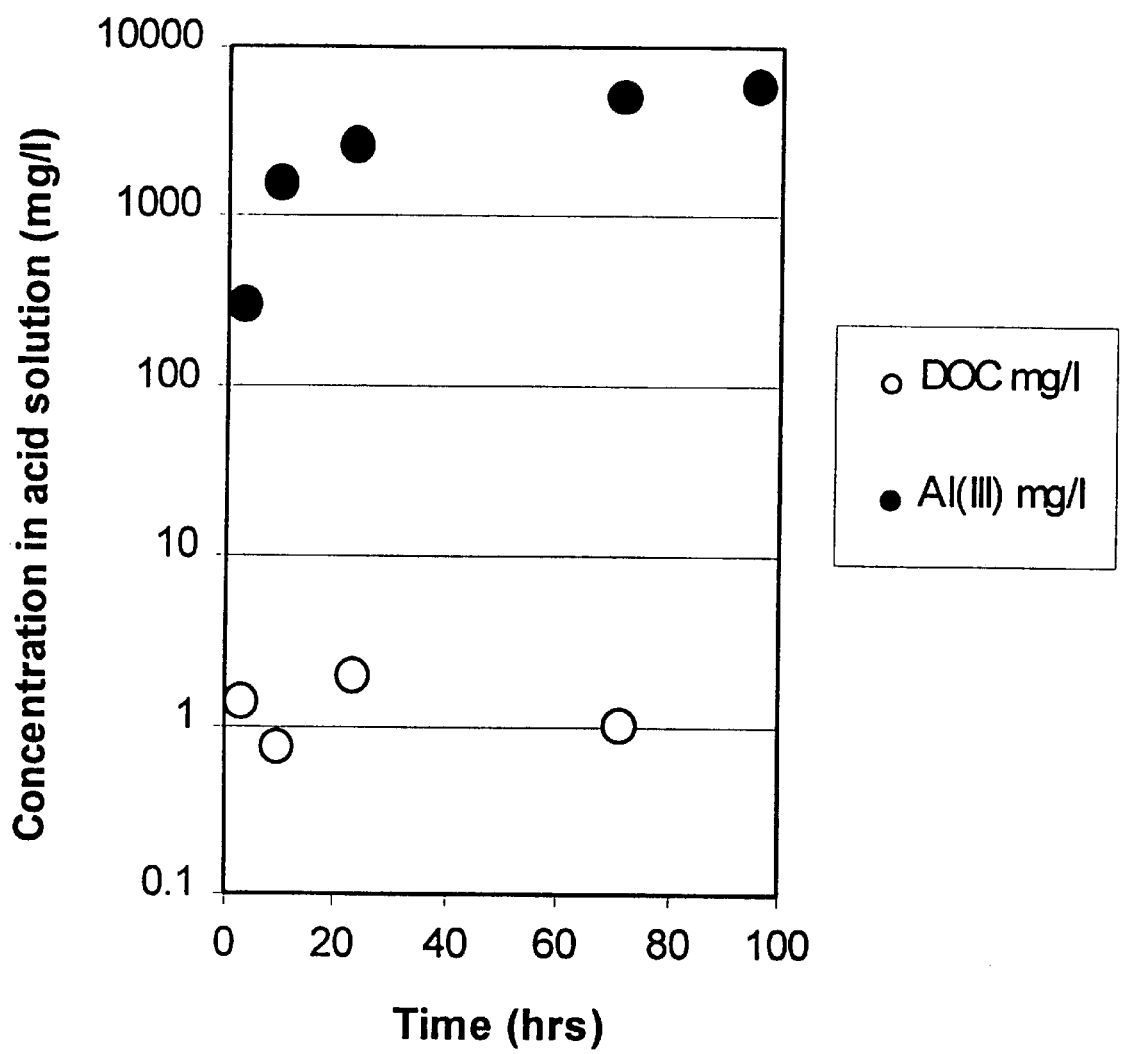
FIG. 3 is a graph comparing concentration of recovered aluminum with the concentration of DOC recovery over time, using the process in accordance with the invention.
Figure 4:
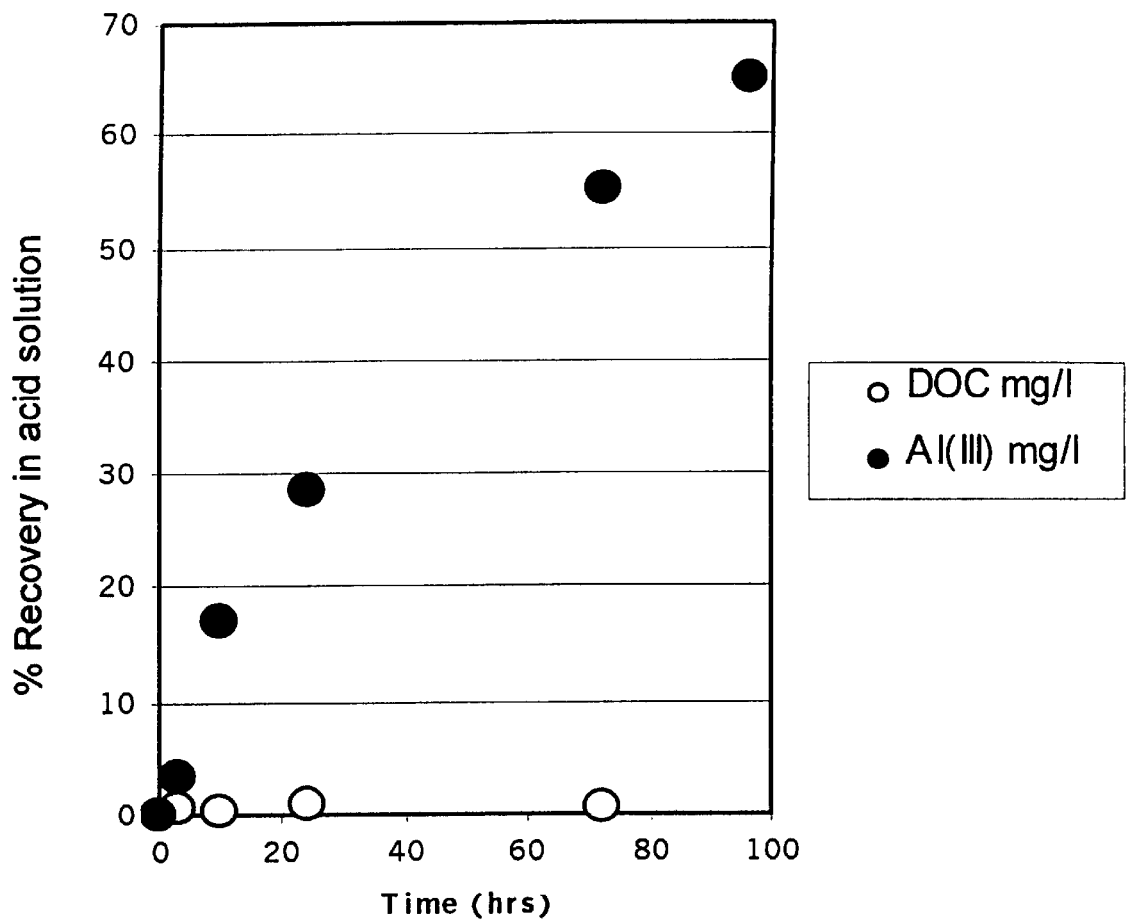
FIG. 4 is a graph comparing the percentage of aluminum recovered with DOC permeation over time.

FIGS. 3 and 4 compare aluminum recovery versus DOC recovery as a function of time. While aluminum concentration (FIG. 3) increased to over 5000 mg/L as Al in the recovered alum, DOC was practically negligible, i.e., less than 3.0 mg/L. FIG. 4 shows that more than 65% of the Al in the sludge was recovered and that the recovered Al was virtually free of NOM and suspended solids. In a separate set of experiments, about 85% of the Al originally present in the sludge was recovered by increasing the membrane surface area.

Figure 5:
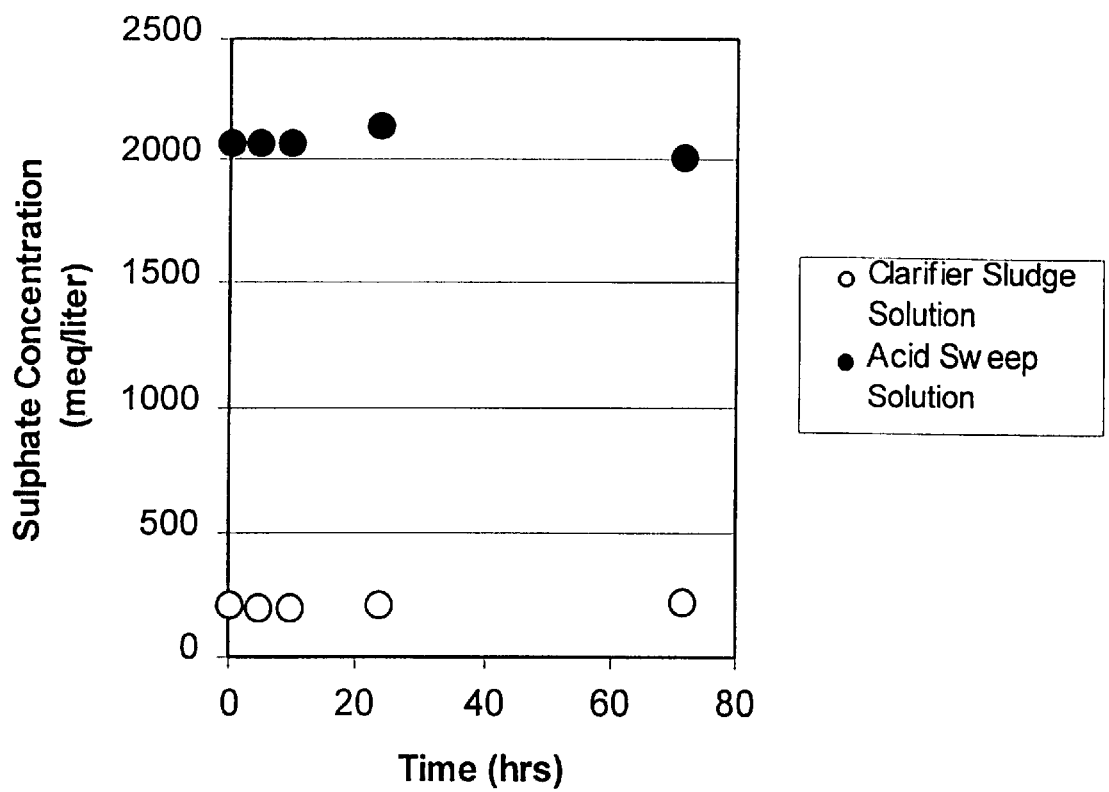
FIG. 5 is a graph illustrating the sulphate ion concentration on both sides of a semi-permeable cation exchange membrane.

As shown in FIG. 5, the sulfate concentrations on the sweep side and sludge side remained practically unchanged, confirming the impermeability of the cation exchange membranes to anions.

The following table provides a comparison of the composition of the recovered alum between an acid digestion process and the Donnan membrane process in accordance with the invention.

| Constituents in mg/l | Donnan Membrane Process | Acid Digestion Process |
|---|---|---|
| Al(III) | 5650 | 2900 |
| Fe(III) | 187 | 159 |
| Total Suspended solids | negligible | significant |
| DOC or NOM | 0–3 | 200–225 |

It is apparent from the table that the Donnan membrane process achieves much higher purity in the recovered alum. In a visual comparison of recovered alums from these two processes, the alum recovered by acid digestion was dark and cloudy, whereas the alum recovered by the Donnan membrane process was clear and transparent, similar to fresh liquid alum. Due to its negligible DOC content, the alum recovered by the Donnan membrane process in accordance with the invention may be safely reused as a coagulant with no possibility of trichloromethane formation upon chlorination. In the recovered alum, aluminum and iron are the only major species, and, as mentioned previously, the presence of iron or Fe(III) in the recovered alum does not have any adverse effect. On the contrary, Fe(III) enhances the effectiveness of alum as a coagulant.

Figure 6:
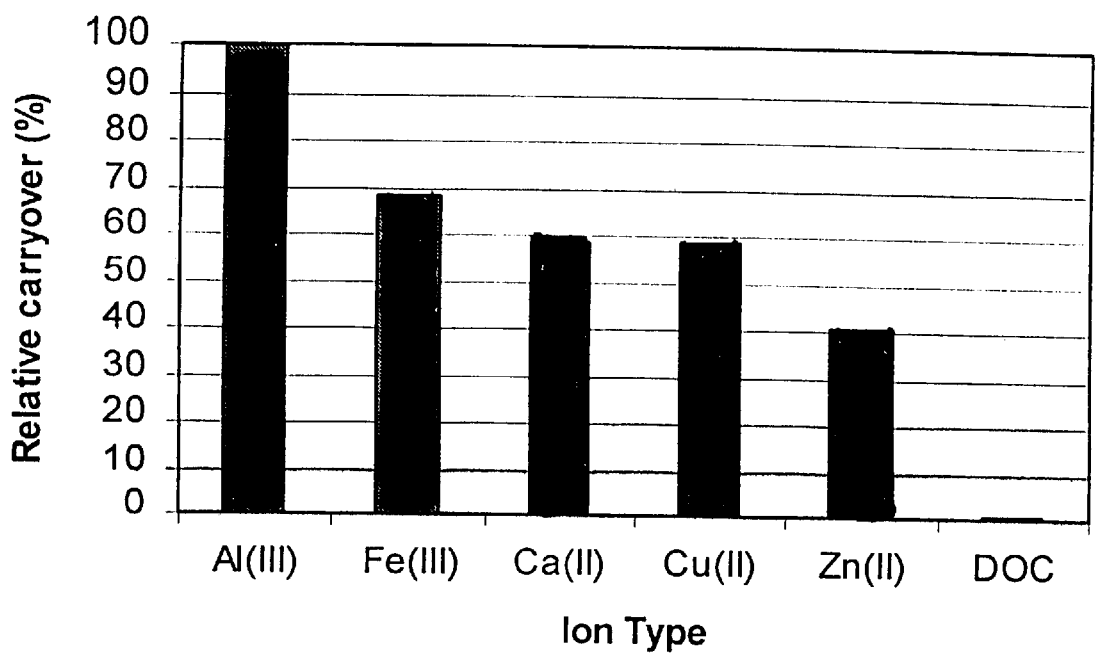
FIG. 6 is a bar chart showing the relative carryover of aluminum and other metal ions through the semi-permeable cation exchange membrane.
Figure 7:
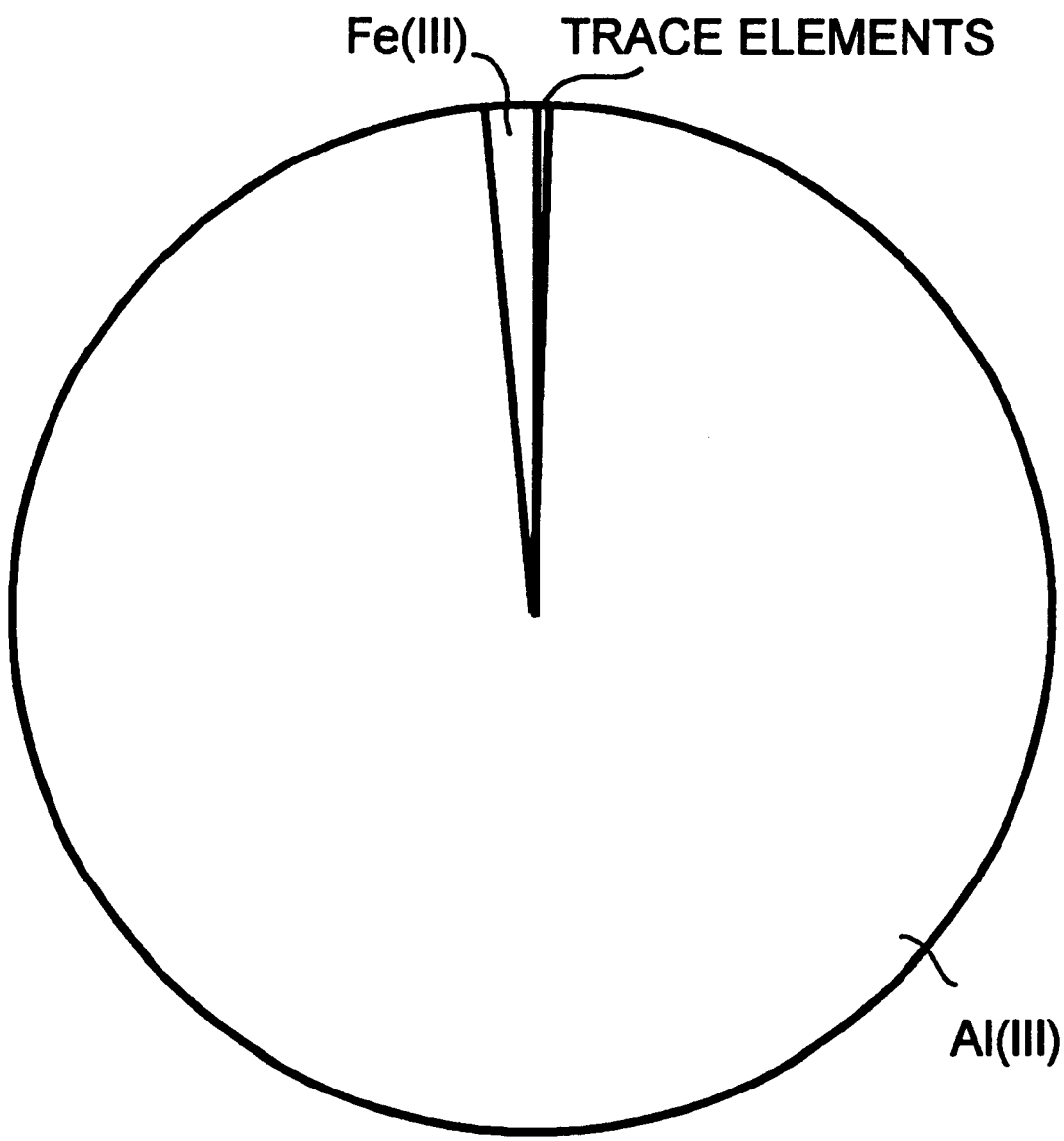
FIG. 7 is a pie chart illustrating the distribution of various dissolved species in alum recovered in accordance with the invention.

The bar chart in FIG. 6 shows that the relative recovery of aluminum is also selective with respect to other metal cations, including heavy metal cations. The carryover of all other cations into the recovered alum is lower than that for aluminum. As shown in FIG. 7, aluminum and iron are practically the only major species in the alum ultimately recovered. Of the cations, typically 98% are Al(III) and 2% are Fe(III), the remainder being trace amounts of zinc, calcium, cupper, arsenic and other elements along with trace amounts of dissolved organic carbon. Thus, in the recovered alum, the concentration of aluminum is over two orders of magnitude greater than heavy metals and dissolved organic carbon. In essence the recovered solution is a pure, concentrated solution of aluminum sulfate, with minor trace compounds.

The advantages of the Donnan membrane process for selective alum recovery may be summarized as follows.

First, the process is operationally simple, requiring only two low-pressure pumps, a stack of cation exchange membranes, and sulfuric acid.

Preliminary cost calculations indicate that savings resulting from the reuse of recovered alum and the reduction in sludge disposal costs make the proposed process economically viable.

The acid sweep solution allows both solution of Al(OH)$_3$(s) and selective Al$^{3+}$ recovery through the semi-permeable cation exchange membrane. No pressure differential is required across the membrane, and, since pressure is not the driving force in the process, the high concentration of solids in clarifier sludge does not foul the membrane or adversely affect its performance. Changes in sludge composition have only a minor impact on the operation of the process. Except for the pumps, the process does not require any moving part and is, therefore, operationally simple. The cation exchange membranes are chemically stable over the entire range of pH and mechanically strong. The only expendable chemical used in the Donnan membrane process is the acid used for preliminary pH adjustment and for the acid sweep solution. The aluminum recovered by the process is concentrated and does not contain NOM, suspended solids or other objectionable constituents.

The Donnan membrane process has particular advantages in regard to its ability to: concentrate aluminum in the recovered solution; achieve near-complete rejection of natural organic matter (NOM) or dissolved organic carbon (DOC); reduce carryover of heavy metals such as copper, zinc, etc., into the recovered alum; provide for the use recovered alum as a coagulant in the same plant without the possibility of trichloromethane formation upon chlorination; and reduce the volume of the sludge and the cost of its disposal.

Various modifications can be made to the apparatus and process described. For example, instead of sulfuric acid, other acids, such as hydrochloric acid (HCl) can be used for pH adjustment and as the acid in the acid sweep solution. Sulfuric acid and hydrochloric acid sweep solutions allow both solution of Al(OH)$_3$(s) and selective Al$^{3+}$ recovery through the semi-permeable cation exchange membrane."

Figure 8:
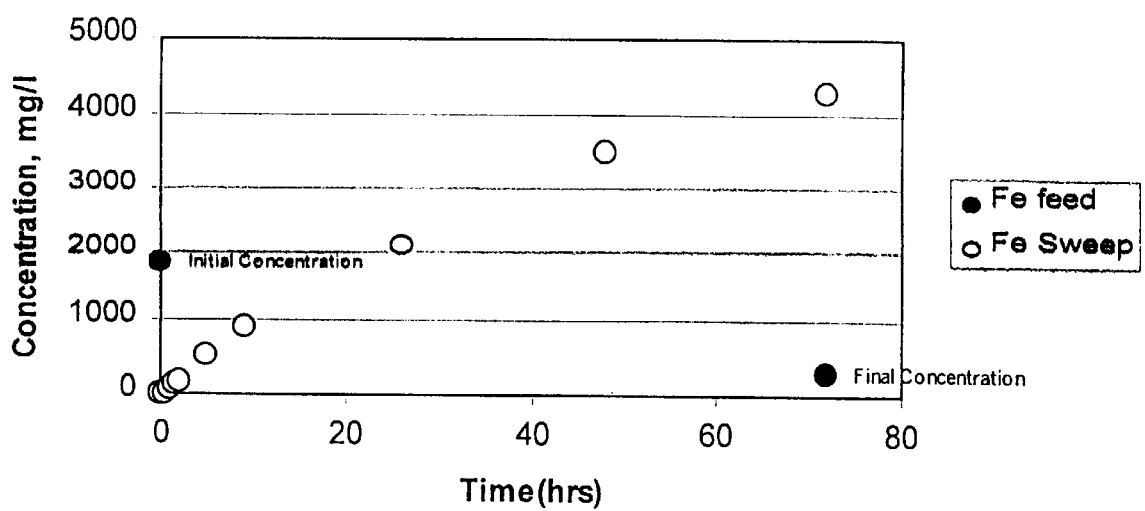
FIG. 8 is a graph illustrating the selective recovery of Fe(III) ions over time, using the process of the invention.
Figure 9:
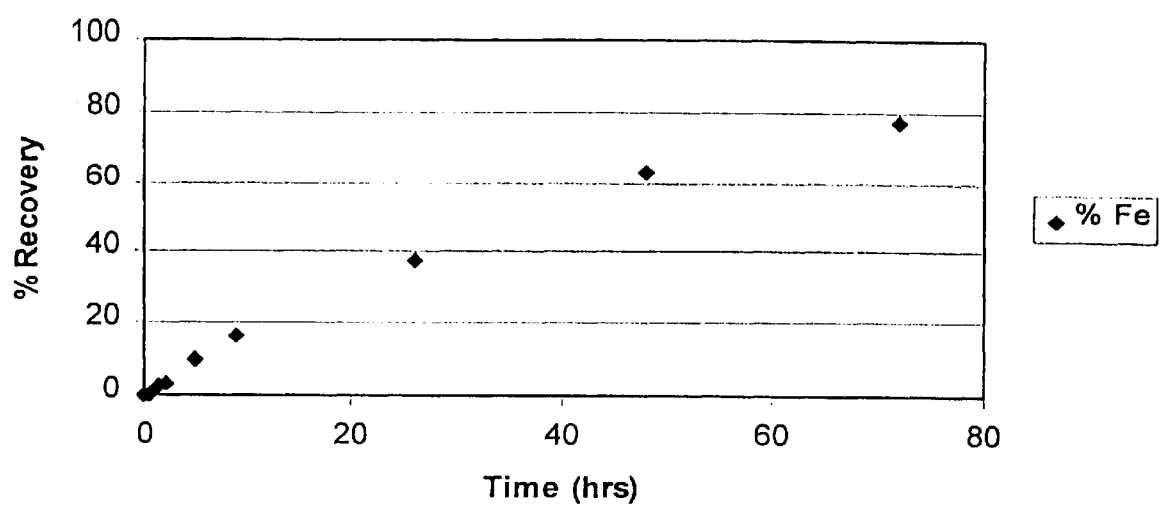
FIG. 9 is a graph illustrating the amount of Fe(III) recovered over time.

Fe(III) salts are also used as coagulants in water treatment plants, and the Donnan membrane technique is equally effective for selective Fe(III) recovery and reuse. FIG. 8 shows how a simulated sludge containing 1800 mg/l Fe(III) can be concentrated with this process and FIG. 9 confirms that recovery as high as 80% can be obtained.

The exchanger can take various alternative forms. For example, the exchanger can consist of a single membrane separating two chambers, one for the sludge solution, and one for the acid sweep solution. Alternatively, the exchanger can be constructed as a stack of membranes, similar to the stack shown in FIG. 2, but provided with manifolds directing each liquid in plural paths, so that for a given liquid, e.g., the sludge solution, the liquid in each sludge solution path flows in the same direction as the liquid in every other parallel sludge solution path.

Various other modifications can be made to the invention described without departing from the scope of the invention as defined in the following claims.

What is claimed is:

1. A process for the selective recovery of a trivalent metal coagulant compound from clarifier sludge solution comprising the steps of:

contacting the aqueous clarifier sludge solution with a first side of a semi-permeable cation exchange membrane having first and second opposite sides, while simultaneously contacting an acidic sweep solution to the second side of said cation exchange membrane, thereby causing trivalent metal ions from the coagulant compound to pass through the membrane from the first side to the second side, and hydrogen ions to pass through the membrane from the second side to the first side.

2. The process according to claim 1, in which the cation exchange membrane comprises a plurality of sheets of cation exchange membrane disposed in a stack, the sheets being separated from one another in the stack by spaces, and in which the solutions are directed to and from the stack so that the clarifier sludge solution and the acidic sweep solution flow through alternate spaces.

3. The process according to claim 1, in which the cation exchange membrane comprises a plurality of sheets of cation exchange membrane disposed in a stack, the sheets being separated from one another in the stack by spaces, in which the solutions are directed to and from the stack so that the clarifier sludge solution and the acidic sweep solution flow through alternate spaces, and in which the spaces through which the clarifier sludge solution flows are connected in series, and the spaces through which the acidic sweep solution flows are also connected in series.

4. The process according to claim 1, in which a pH of the clarifier sludge solution is approximately 3.

5. The process according to claim 1, in which the pressure difference across said membrane is maintained substantially at zero.

6. The process according to claim 1, in which the coagulant compound comprises alum.

7. The process according to claim 1, in which the coagulant compound comprises a ferric compound.

8. A process for the selective recovery of alum from clarifier sludge containing aluminum hydroxide comprising the steps of:

adjusting the pH of the clarifier sludge to a level such that at least the majority of the aluminum content of the clarifier sludge is in solution, thereby producing an aqueous clarifier sludge solution;

contacting the aqueous clarifier sludge solution with a first side of a semi-permeable cation exchange membrane having first and second opposite sides, while simultaneously contacting an acidic sweep solution to the second side of said cation exchange membrane, thereby causing aluminum ions to pass through the membrane from the first side to the second side, and hydrogen ions to pass through the membrane from the second side to the first side.

9. The process according to claim 8, in which the cation exchange membrane comprises a plurality of sheets of cation exchange membrane disposed in a stack, the sheets being separated from one another in the stack by spaces, and in which the solutions are directed to and from the stack so that the clarifier sludge solution and the acidic sweep solution flow through alternate spaces.

10. The process according to claim 8, in which the cation exchange membrane comprises a plurality of sheets of cation exchange membrane disposed in a stack, the sheets being separated from one another in the stack by spaces, in which the solutions are directed to and from the stack so that the clarifier sludge solution and the acidic sweep solution flow through alternate spaces, and in which the spaces through which the clarifier sludge solution flows are connected in series, and the spaces through which the acidic sweep solution flows are also connected in series.

11. The process according to claim 8, in which, in the pH adjusting step, the clarifier sludge is adjusted to a pH of approximately 3.

12. The process according to claim 8, in which the pressure difference across said membrane is maintained substantially at zero.

13. A process for the selective recovery of alum from clarifier sludge containing aluminum hydroxide comprising the steps of:

adjusting the pH of the clarifier sludge to a level such that at least the majority of the aluminum content of the clarifier sludge is in solution, thereby producing an aqueous clarifier sludge solution;

circulating the aqueous clarifier sludge solution through a first circulatory path in which the circulating clarifier sludge solution contacts a first side of a semi-permeable cation exchange membrane having first and second opposite sides, while simultaneously circulating an acidic sweep solution through a second circulatory path in which the acidic sweep solution contacts the second side of said cation exchange membrane, thereby causing aluminum ions to pass through the membrane from the first side to the second side and into the second circulatory flow path, and hydrogen ions to pass through the membrane from the second side to the first side and into the first circulatory flow path while substantially preventing passage of anions, organic molecules and suspended solids through the membrane and selectively favoring the passage through the membrane of aluminum ions over monovalent and divalent cations;

whereby the concentration aluminum in the second circulatory path increases while the solution in the second circulatory path remains substantially free of anions and organic molecules, the concentration of toxic metals in the second circulatory flow path is maintained at a low level, and the hydrogen ions regenerate the membrane and acidify the solution in the first circulatory path, thereby causing further quantities of aluminum in the first circulatory path to go into solution.

14. The process according to claim 13, in which the cation exchange membrane comprises a plurality of sheets of cation exchange membrane disposed in a stack, the sheets being separated from one another in the stack by spaces through which said solutions flow, and in which the solutions are directed to and from the stack so that the circulating flow path for clarifier sludge solution and the circulating flow path for acidic sweep solution occupy alternate spaces.

15. The process according to claim 13, in which the cation exchange membrane comprises a plurality of sheets of cation exchange membrane disposed in a stack, the sheets being separated from one another in the stack by spaces through which said solutions flow, in which the solutions are directed to and from the stack so that the clarifier sludge solution and the acidic sweep solution flow through alternate spaces, and in which the spaces through which the clarifier sludge solution flows are connected in series, and the spaces through which the acidic sweep solution flows are also connected in series.

16. The process according to claim 13, in which, in the pH adjusting step, the clarifier sludge is adjusted to a pH of approximately 3.

17. The process according to claim 13, in which the pressure difference across said membrane is maintained substantially at zero.

\* \* \* \* \*